Patented Sept. 14, 1954

2,689,203

UNITED STATES PATENT OFFICE 2,689,203

PREPARATION OF STABILIZED CATALASE

August L. Lolli, Chicago, Ill., assignor to Armour and Company, Chicago, Ill., a corporation of Illinois No Drawing. Application September 27, 1951, Serial No. 248,664

12 Claims. (Cl. 195—63)

This invention relates to the preparation of stabilized liquid catalase.

An object of the invention is to provide a stabilized catalase product and a method for preparing the same. A further object is to provide a water solution of catalase in combination with a stabilizing agent or agents which will cause the catalase to retain its activity over long periods of time. Other specific objects and advantages will appear as the specification proceeds.

In one embodiment of the invention, sodium citrate is added to an aqueous solution of catalase and after standing for a while the material is preferably sterile-filtered and sealed within containers.

I prefer to add to the catalse solution from 1% to 5% of sodium citrate and to allow the preparation to age (proof) for a week or more, and preferably up to about four weeks at a temperature not over 30°. The sodium citrate may be used in increased amounts when desired but best results have been obtained with sodium citrate in the amounts of 1% to 5%.

The addition of the sodium citrate and the processing as described gives an excellent product in which the activity of the catalase is stabilized. I have found also that a highly stable product can be obtained by the use of sodium citrate as described together with glycerol and thymol. For example, to the catalase solution may be added 2% sodium citrate, 15% glycerol, and 1% thymol, and the mixture allowed to age for a week, and preferably up to four weeks. I prefer then to sterile-filter the material and seal it within sterile containers.

The proportions of the ingredients may vary considerably. The sodium citrate is preferably in the range of 1% to 5% and glycerol is in the range of 15% to 25%, while thymol may be used in the range of .5% to 2% and higher.

As another embodiment of the invention, the sodium citrate and glycerol may be combined with the aqueous catalase solution and aged to provide a stabilized catalase product. Similarly, to the aqueous solution may be added sodium citrate and thymol. I have found, however, that the best results are obtained by the combining of the sodium citrate, glycerol and thymol with the aqueous solution of catalase.

By way of example, in preparing a stable liquid catalase of 1 to 30 strength, a solution of catalase having an activity of 30 was prepared by adding glycerol, sodium citrate and thymol, together with distilled water, to the catalase. The product was allowed to age for four weeks and then sterile-filtered and packaged. The temperature during the aging period was held below room temperature and preferably about 2° C. Similar products were prepared by employing sodium citrate and glycerol with the aqueous solution of catalase and sodium citrate and thymol with the sodium citrate. Best results were obtained, as stated above, by the combination of the sodium citrate, glycerol and thymol in the aqueous solution of catalase.

If the whole process is carried out at around 2° C. the chances of spoilage are minimized. Aging is speeded up at higher temperatures but it is preferred to carry the whole process out at the cooler temperature.

In each of the processes I have found that better results are obtained when the material is allowed to age or proof for a substantial period of time. I prefer that this aging period extend above one week and be in the neighborhood of four weeks.

If desired, the stabilizing materials, including sodium citrate alone or in combination with glycerol and/or thymol, may be used in the water employed to extract the active principle from the crude catalase.

Specific examples may be set out as follows:

*Example I*

In preparing a 1 to 30 liquid catalase, 38 grams of catalase having an activity of 30 were dissolved in a mixture of 681 grams of glycerol, 75.5 grams of sodium citrate, and 36 grams of thymol made up to one gallon of distilled water. The mixture was allowed to age for four weeks. The material was then sterile-filtered and sealed within containers.

*Example II*

1% of sodium citrate was dissolved in an aqueous solution of catalase and allowed to stand for four weeks. The solution was then sterile-filtered and packaged. The solution of catalase had an activity of 30 at the beginning and after four months of aging it was found that the activity had remained at the same level (K value of 30). By "activity of 30" is meant that 1 cc. of catalase solution destroys 30 cc. of 100% hydrogen peroxide.

*Example III*

The process was carried on as in Example I except that 2% of sodium citrate was employed. The solution was proofed for four weeks and then sterile-filtered and packaged. After six months at temperature of 2° C. no change was noted. After aging it for four months at room temperature the activity was found retained. At a higher temperature of 37° C. no change of activity was found after one week's test.

The above process was carried on with the sodium citrate in percentages of 3% and 4% and 5% with comparable results.

*Example IV*

A 100 cc. solution of catalase having an activity of 30 was prepared with 1% sodium citrate and 15% glycerol, the pH being adjusted to 5.6 with hydrochloric acid. After eight weeks at 2° C., the solution was found to retain its activity, after one week at room temperature the solution retained its activity, and after a test extending over four days at 37° C. the solution was found to retain its activity.

*Example V*

A 100 cc. solution of catalase having an activity of 30 was combined with 2% sodium citrate and 1% thymol and allowed to stand for over a week. Results similar to those obtained in Example IV were obtained.

*Example VI*

Crude catalase was extracted with a mixture of 15% glycerol, 1% thymol, and 2% sodium citrate. The extract was allowed to stand for four weeks for aging and then sterile-filtered. After six months standing at 2° C., no decrease in activity was found. A second sample after standing at room temperature for four months was found not to have lost its activity. A third sample of the filtered material after standing at 37° C. for a week was found to have retained its activity.

As set out above, the addition of the sodium citrate exerts a marked effect upon the liquid catalase solution and is effective even when used alone in maintaining the stability of the catalase. Aging the material for a substantial period increases the effectiveness. I have found that the results are enhanced through the adding of the glycerol and/or thymol to the citrate and catalase solution. The catalase solution which ordinarily will retain its activity for a short time under ordinary conditions of handling and use is now caused to remain stabilized for substantially indefinite periods by the procedure described.

While in the foregoing specification I have set forth specific steps in considerable detail for the purpose of illustrating embodiments of the invention, it will be understood that such details may be varied widely by those skilled in the art without departing from the spirit of my invention.

I claim:

1. A stable catalase product, comprising an aqueous solution of catalase and sodium citrate.

2. A stable catalase product, comprising glycerol and an aqueous solution of catalase and sodium citrate.

3. A stable catalase product, comprising thymol and an aqueous solution of catalase and sodium citrate.

4. A stable liquid catalase product, comprising glycerol, thymol, sodium citrate and an aqueous solution of catalase.

5. In a process for the preparation of stabilized catalase, the steps of combining catalase, water and sodium citrate to form a solution thereof.

6. In a process for the preparation of stabilized catalase, the steps of combining water, catalase and sodium citrate to form a solution and aging the solution.

7. In a process for the preparation of stabilized catalase, the steps of combining water, catalase and sodium citrate to form a solution and aging the solution for more than a week.

8. In a process for the preparation of stabilized catalase, the step of extracting crude catalase with an aqueous solution of sodium citrate.

9. In a process for the preparation of stabilized catalase, the steps of combining water, catalase, sodium citrate and glycerol, and aging the solution.

10. In a process for the preparation of stabilized catalase, the steps of combining water, catalase, sodium citrate and thymol, and aging the solution.

11. In a process for the preparation of stabilized catalase, the step of combining water, catalase and sodium citrate with glycerol and thymol.

12. In a process for the preparation of stabilized catalase, the steps of combining water, catalase and sodium citrate with glycerol and thymol and aging the liquid material for more than a week.

References Cited in the file of this patent

UNITED STATES PATENTS

| Number | Name | Date |
|---|---|---|
| 2,068,623 | Warburg | Jan. 19, 1937 |

OTHER REFERENCES

Michaelis and Pechstein: Biochem. Zeitschrift 53 (1913), article pages 320–355. Pages 348 and 353–355 relied upon.

Nord: Advances in Enzymologie, Interscience Pub. Inc., N. Y., vol. 1 (1941), page 165: vol. 7 (1947), pages 298–300.

Bonnischen, R. R.: Arch. Biochem., 12 (1947), page 85.